No. 651,064. Patented June 5, 1900.
A. BIPPART.
LINK BUTTON.
(Application filed Oct. 27, 1899.)
(No Model.)

Attest:
L. Lee
Walter H. Talmage.

Inventor.
Achill Bippart, per
Thomas S. Crane, Atty.

UNITED STATES PATENT OFFICE.

ACHILL BIPPART, OF NEWARK, NEW JERSEY.

LINK-BUTTON.

SPECIFICATION forming part of Letters Patent No. 651,064, dated June 5, 1900.

Application filed October 27, 1899. Serial No. 734,908. (No model.)

*To all whom it may concern:*

Be it known that I, ACHILL BIPPART, a citizen of the United States, residing on Sixteenth street, near Clinton avenue, Newark, county of Essex, State of New Jersey, have invented certain new and useful Improvements in Link-Buttons, fully described and represented in the following specification and the accompanying drawings, forming a part of the same.

The object of the present invention is to furnish the link of a cuff-button with such connections to the button-heads that the link may be held centrally in the buttonhole, the button-head may lie close to the linen of the cuff, the link connection may be pressed flat to the button when inserting it in the buttonhole, and the center of the button may be adapted for perforation to receive a jewel when desired. This object is attained by hinging the broad arched bail upon each of the button-heads by pivots which hold the bail close to the inner side of the head when inserting it through the buttonhole. The bail is formed with an arch upon which the link can turn laterally into any position and is provided with inwardly-turned pivots, which may be secured to the button-head by an annular hinge-piece, so as to leave the center of the button-head unobstructed. With such construction the link-button may be perforated at any time if it be desired to insert a jewel therein. The inner side of the button-head is preferably recessed where the hinge-piece of the bail is attached, so that the hinge-piece may be sunk in the back of the button-head, and thus form the least possible projection upon the inner side of the button to obstruct its insertion through the buttonhole.

The invention also includes an improved construction for the link which connects the two bails.

These improvements will be understood by reference to the annexed drawings, in which—

Figure 1:
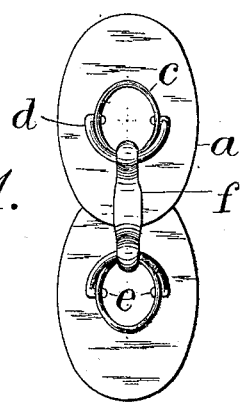
Figure 2:
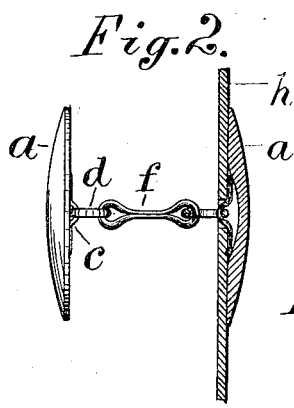
Figure 3:
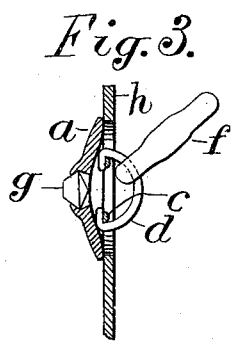
Figure 4:
Figure 5:
Figure 6:
Figure 7:
Figure 8:
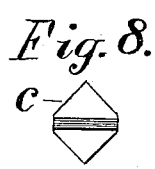
Figure 9:
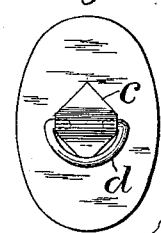
Figure 10:
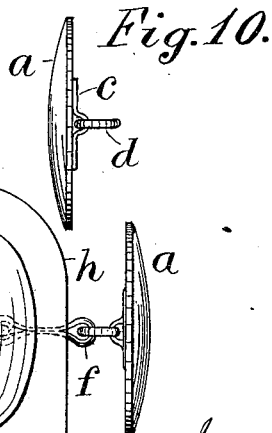
Figure 11:
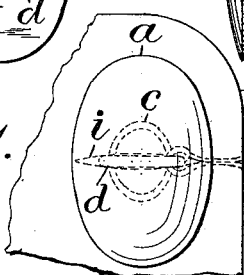

Figure 1 shows the inner side of two button-heads provided with my improved link and connections. Fig. 2 is an edge view of the link-button with the cuff and one of the button-heads in section. Fig. 3 is a transverse section of one of the button-heads and cuff adjacent to the clevis. Fig. 4 is an elevation of the bail; Fig. 5, an elevation of the blank for the link. Fig. 6 shows such blank bent to shape the eyes, and Fig. 7 shows the completed link. Fig. 8 shows a diamond-shaped hinge-piece for the bail. Fig. 9 shows the inner side of a button-head with the bail secured upon such diamond plate, and Fig. 10 is an edge view of the same. Fig. 11 shows the relation of the button-head to the buttonhole in the cuff with my construction.

The button-heads $a$ may be made of any desired style or pattern, but are shown herein of oval shape, with shallow recess $b$ upon the inner side.

The hinge-piece $c$ is shown of annular form in Figs. 1, 2 and 3, consisting merely of a ring with offsets or indentations at two opposite sides to receive the pivots of the bail. The ring $c$ is shown almost entirely buried within the recess $b$, where it is secured by solder or otherwise when the links and bails are adjusted in position.

The bail $d$ (shown in Fig. 4) is an arched wire shaped something like a pail-handle, with the ends bent inwardly to form the pivots $e$, which are inserted within the indentations at the margin of the hinge-piece. With this construction of the bail the eyes of the link are readily slipped over the pivots of the clevis before the hinge-piece is applied thereto.

The link $f$ is formed first with parallel sides, as shown in Fig. 5, which are pressed together intermediate to the ends, as shown in Fig. 6, to form the eyes, and the middle portion is then flattened to diminish its thickness where it will be pressed against the edge of the button-head in passing through the buttonhole of the cuff. Such pressure slightly widens the link at the middle, as shown in Fig. 1, where the flattened edge of the link is shown laid upon the edge of the button-head in readiness to pass through the buttonhole.

Fig. 3 shows the center of the button-head perforated and a jewel $g$ inserted therein, and the proper setting of such jewel is obviously dependent upon the open space within the annular hinge-piece and the arched formation of the bail. This construction enables the manufacturer or dealer to carry the buttons in stock without jewels and to insert a jewel in the center of the button-head for any purchaser who may desire the same, which has not heretofore been possible with the majority of the connections that are used for attaching the link to the button-head. Where no provision for inserting a jewel is desired, the hinge-piece may be made, as shown in Figs. 8 and 9, of a flat plate with indentation extended across its middle, into the ends of which the pivots of the bail are inserted. I am aware that a small bail analogous to mine has been used in connection with a narrow loop for joining its base to the back of the button-head, but not so as to hold the pivots of the bail in contact with the button-head, as in my construction. Where the narrow loop alone remains in the buttonhole, the button-head can slip sidewise and uncover the buttonhole; but in my construction the bail is not only made with a broad arch, but its pivots are held in close contact with the back of the button-head, so that the bail itself is always retained in the buttonhole and operates most effectively to hold the button-head over the center of the buttonhole, which prevents the exposure of the buttonhole in an objectionable manner. Such effect of the bail is shown in Fig. 11, which shows the edge of the cuff $h$ with the button-head lying over the buttonhole and the bail operating by fitting within the buttonhole $i$ to prevent the link from drawing the button too closely to the end of the cuff. The breadth of the bail obviously prevents the center of the button-head from drawing so near to the edge of the buttonhole, as would be the case with a narrower connection or with one which did not hold the base of the bail close to the button-head, and thus retain the whole breadth of the bail in the buttonhole. The depression or recess $b$ upon the inner side of the button-head prevents the projection of the hinge-piece in any material degree from the back of the button-head. Although the entire bail passes into the buttonhole, the head is enabled to lie close to the outside of the cuff $h$, as shown in Figs. 2 and 3, which is a great desideratum in cuff-buttons.

From the description it will be seen that the cuff-button is easily inserted through the buttonhole, is held over the center of the buttonhole when in use, and lies close to the outside of the cuff, while the annular form of the hinge-piece or fastening by which the link is secured to the back of the button-head permits the center of the button to be perforated and a jewel inserted, if desired.

Although I have claimed the link $f$, constructed as herein described, it will be understood that the other elements of the construction can be used with any preferred form of link.

It will be observed that the pivots of the bail are hinged to the back of the button-head at the edges of the perforation in which the jewel is set, which leaves the space between the pivots entirely open, and as this construction possesses essential advantages I have made a special claim thereto.

Having thus set forth the nature of the invention, what is claimed herein is—

1. The combination, with the link $f$ and the button-heads $a$ formed each upon the inner side with the recess $b$, of the broad arched bails $d$ having pivots $e$ held within such recesses by a suitable hinge-piece, whereby the arch of each bail extends to the inner face of the button-head, and is thus retained in the buttonhole and operates to center the button-head over the same, substantially as herein set forth.

2. The combination, with the button-heads and a suitable link, of the arched bail having pivots $e$ bent inwardly, and an annular hinge-piece for securing each bail to the button-head without covering the center of the head, as and for the purpose set forth.

3. The combination, with the button-heads having bails hinged together, of a link formed with eyes of a given thickness, the metal of the eyes extended in parallel bars into the body of the link, and such parallel bars pressed together laterally in the plane of the link to the same aggregate thickness as the metal around the eyes, substantially as herein set forth.

In testimony whereof I have hereunto set my hand in the presence of two subscribing witnesses.

ACHILL BIPPART.

Witnesses:
THOMAS S. CRANE,
WILLIAM H. ROBERTS.